US011858779B2

United States Patent
(12) United States Patent
Kattainen et al.

(10) Patent No.: US 11,858,779 B2
(45) Date of Patent: Jan. 2, 2024

(54) ELEVATOR SAFETY ARRANGEMENT AND ELEVATOR

(71) Applicant: Kone Corporation, Helsinki (FI)

(72) Inventors: Ari Kattainen, Helsinki (FI); Juha-Matti Aitamurto, Helsinki (FI); Antti Hovi, Helsinki (FI); Juha Panula, Helsinki (FI); Jari Kantola, Helsinki (FI); Matti Rasanen, Helsinki (FI); Janne Mikkonen, Helsinki (FI); Nithil Karimpanackal Natarajan, Helsinki (FI); Jari Pursiainen, Helsinki (FI); Markku Haapaniemi, Helsinki (FI)

(73) Assignee: Kone Corporation, Helsinki (FI)

( * ) Notice: Subject to any disclaimer, the term of this patent is extended or adjusted under 35 U.S.C. 154(b) by 1174 days.

(21) Appl. No.: 16/385,313

(22) Filed: Apr. 16, 2019

(65) Prior Publication Data

US 2019/0256322 A1 Aug. 22, 2019

Related U.S. Application Data

(63) Continuation of application No. PCT/EP2017/077635, filed on Oct. 27, 2017.

(30) Foreign Application Priority Data

Oct. 27, 2016 (EP) .................................... 16195958

(51) Int. Cl.
*B66B 5/00* (2006.01)
*B66B 1/28* (2006.01)
(Continued)

(52) U.S. Cl.
CPC .............. *B66B 5/0081* (2013.01); *B66B 1/28* (2013.01); *B66B 1/3492* (2013.01); *B66B 5/005* (2013.01);
(Continued)

(58) Field of Classification Search
CPC ... B66B 5/005; B66B 5/0081; B66B 11/0246; B66B 5/0031
See application file for complete search history.

(56) References Cited

U.S. PATENT DOCUMENTS 10,836,605 B2 * 11/2020 Roussel ................ B66B 5/0081

FOREIGN PATENT DOCUMENTS

EP 1500523 A1 1/2005
EP 2138440 A1 * 12/2009 ........... B66B 5/0081
(Continued)

OTHER PUBLICATIONS

International Search Report (PCT/ISA/210) for International Application No. PCT/EP2017/077635 Filed Oct. 27, 2017.
(Continued)

*Primary Examiner* — Diem M Tran
(74) *Attorney, Agent, or Firm* — Harness, Dickey & Pierce, P.L.C.

(57) ABSTRACT

The invention relates to an elevator safety arrangement comprising a hoistway; an elevator car mounted in the hoistway; a working platform on top of the elevator car; at least one movable balustrade, which is movable between a substantially upright position and a substantially horizontal position; and a sensing arrangement for sensing position of the movable balustrade, said sensing arrangement for sensing position of the movable balustrade comprising at least one sensor for sensing position of the balustrade. Said at least one sensor for sensing position of the balustrade comprises a sensor body and a sensor head, and the sensor head is movable relative to the sensor body, and the balustrade is arranged to move the sensor head when pivoted, the balustrade comprising a cam member pivotal together with the balustrade, the cam member comprising one or more protrusions and depressions, and the sensor head is placed
(Continued)

against the cam member for being actuated by aid of at least one protrusion and at least one depression of the cam member.

12 Claims, 2 Drawing Sheets

(51) Int. Cl.
*B66B 11/02* (2006.01)
*B66B 1/34* (2006.01)
(52) U.S. Cl.
CPC ........ *B66B 5/0031* (2013.01); *B66B 11/0246* (2013.01)

(56) References Cited

FOREIGN PATENT DOCUMENTS

| | | | | | |
|---|---|---|---|---|---|
| GB | 2158038 | A | | 11/1985 | |
| JP | 2011190088 | A | | 9/2011 | |
| WO | WO-03093157 | A1 | * | 11/2003 | ........... B66B 5/0062 |
| WO | WO-2005/105645 | A1 | | 11/2005 | |
| WO | WO-2015/110696 | A1 | | 7/2015 | |
| WO | WO-2016110934 | A1 | * | 7/2016 | ........... B66B 5/0062 |
| WO | WO-2018078762 | A1 | * | 5/2018 | ............. B66B 11/02 |

OTHER PUBLICATIONS

Written Opinion (PCT/ISA/237) for International Application No. PCT/EP2017/077635 Filed Oct. 27, 2017.
European Search Report (EPO Form 1503) for European Application No. EP16195958 Completed Apr. 4, 2017.

* cited by examiner

ELEVATOR SAFETY ARRANGEMENT AND ELEVATOR

This application is a continuation of PCT International Application No. PCT/EP2017/077635 which has an International filing date of Oct. 27, 2017, which claims priority to European Application No. 16195958.0, filed on Oct. 27, 2016, the entire contents of each of which are incorporated herein by reference.

FIELD OF THE INVENTION

The invention relates to safety equipment of an elevator. The elevator is preferably an elevator for vertically transporting passengers and/or goods.

BACKGROUND OF THE INVENTION

In modern elevators, access of persons on top of the elevator car is blocked from passengers of the elevator. Access on top of the elevator car is allowed only for service persons. Typically, when a service person moves into the hoistway, the elevator is automatically shifted from normal automatic operating mode into a service operation mode. In the service operation mode, typically only manual drive of the elevator car is enabled in a safe way. For safety reasons, it is preferred that the elevator is able to obtain information of presence of a person on top of the car, and if such information is obtained, to ensure that safety of the person is not risked. Such a sensing is generally advantageous, but particularly so with elevators the car of which is adapted to drive very close to the ceiling of the hoistway during its travel to the uppermost floor. Without such a sensing, a person on top of the car could get crushed between the roof of the car and the ceiling of the hoistway. In response to detecting a person on top of the car, the elevator can be shifted to a service operation mode wherein car movement too close to the ceiling of the hoistway is disabled. For making safe the presence on top of the car, the elevator may further comprise other kinds of equipment, such as balustrades for bordering the working space and preventing the service person from falling from the top of the car.

In prior art, such elevators are known wherein information of access on top of the car is obtained by detection of opening of a door leading into the hoistway. In prior art, also such elevators are known wherein information of access on top of the car is obtained by sensing load of a working platform mounted on top of roof the elevator car.

A drawback of the known solutions has been that the arrangements have not been sufficiently efficient in obtaining first-hand information of presence of a person or his belongings on top of the car, particularly in terms of space consumption. Furthermore, various safety functions, such as establishing safe operating conditions against falling from the roof have not been produced with very compact and safe overall structure.

BRIEF DESCRIPTION OF THE INVENTION

The object of the invention is to introduce a new solution for ensuring elevator safety, which is space-efficient, reliable and ensures safety of an elevator. An object is to introduce a solution by which one or more of the above defined drawbacks of prior art and/or problems discussed or implied elsewhere in the description can be solved. Embodiments are presented, inter alia, by which said objects are achieved with compact overall structure of the safety equipment mounted on top of the elevator car.

It is brought forward a new elevator safety arrangement comprising a hoistway, an elevator car mounted in the hoistway and a working platform. The working platform is preferably on top of the elevator car. It can be an integral part of the roof of the elevator car or it can be mounted on top of the roof the elevator car. The elevator safety arrangement further comprises at least one balustrade movable between a substantially upright position and a substantially horizontal position. The safety arrangement further comprises a sensing arrangement for sensing position of the movable balustrade, said sensing arrangement for sensing position of the movable balustrade comprising at least one sensor for sensing position of the balustrade. Said at least one sensor for sensing position of the balustrade comprises a sensor body and a sensor head. The sensor head is movable relative to the sensor body. The balustrade is arranged to move the sensor head when pivoted. The balustrade comprises a cam member pivotal together with the balustrade and comprising one or more protrusions and depressions, and the sensor head is placed against the cam member for being actuated by aid of at least one protrusion and at least one depression of the cam member. With this solution one or more of the above mentioned objects can be achieved. The elevator safety arrangement is inter alia space-efficient, reliable and ensures safety of an elevator. This is particularly facilitated by the low structure achieved owing to the utilization of a cam member and at least sensor as defined. Preferable further details are introduced in the following, which further details can be combined with the elevator safety arrangement individually or in any combination.

In a preferred embodiment, said balustrade is mounted on the working platform. In this case, it is particularly advantageous that the structure of the balustrade and the pivoting mechanism as well as the sensing arrangement for sensing position of the movable balustrade are low.

In a preferred embodiment, the elevator safety arrangement comprises at least one sensing arrangement for sensing load of the working platform. Then, preferably said balustrade is mounted on the working platform such that its weight is carried by the working platform. With said arrangement, a load placed on the working platform, were it a person or his belonging, will be detectable by the sensing arrangement. The load will be detectable when it is placed to be supported by the planar upper tread surface of the working platform but also when it is placed to be supported by the balustrade. This is particularly advantageous because if the service person forgets his belongings, such as his tool box, on the horizontally tilted balustrade upon leaving the hoistway, this will also be detectable, and crushing of the toolbox between the car and the hoistway ceiling, or some other related safety risk, will be avoided.

In a preferred embodiment, the working platform comprises a planar upper tread surface for a person to stand on. Preferably, said planar upper tread surface is more than 1000 cm2 in area, more preferably at least 0.5 m2 in area.

In a preferred embodiment, in said substantially horizontal position, said balustrade lies over the planar upper tread surface of the working platform covering it at least partially. Thus, it is positionable for the time of the normal operation mode such that the overall structure becomes low.

In a preferred embodiment, said balustrade is mounted on the working platform pivotally between said substantially upright position and said substantially horizontal position.

Pivotal implementation provides easy sensing of the balustrade position as well as facilitates correct operation and positioning of the balustrade.

In a preferred embodiment, said arrangement for sensing load of the working platform comprises a sensor for sensing position of the working platform.

In a preferred embodiment, the working platform comprises a planar upper tread surface for a person to stand on, and a detent member above the level of said planar upper tread surface of the working platform, and the sensor for sensing position of the working platform is in vertical direction between the car roof and the detent member. This structure provides that the sensor for sensing position of the working platform does not decrease the height of the safety space, i.e. the distance between the planar upper tread surface of the working platform and the ceiling of the hoistway can be maximized. Structure of the working platform can thus also generally be maintained low.

In a preferred embodiment, the sensor of the sensing arrangement for sensing load of the working platform is beside the planar upper tread surface of the working platform. Owing to this kind of positioning of the components relative to each other, overall structure of the safety equipment, including the working platform and the sensing arrangement for sensing load of the working platform, can be maintained low.

In a preferred embodiment, the working platform comprises a lateral border structure extending upwards above the level of the planar upper tread surface, and the detent member is fixedly connected with the lateral border.

In a preferred embodiment, said lateral border is an upright plate section. More particularly it can serve as a so called kick plate.

In a preferred embodiment, the sensor of the sensing arrangement for sensing load of the working platform comprises a sensor body and a sensor head, and vertical movement of the working platform is arranged to bring the detent member towards the car roof such that it compresses the sensor head.

In a preferred embodiment, the sensor head of the sensing arrangement for sensing load of the working platform is vertically movable relative to the body.

In a preferred embodiment, said sensing arrangement for sensing load of the working platform comprises a spring arranged to resist downwardly directed movement of the working platform.

In a preferred embodiment, said balustrade is mounted on the working platform pivotally around a pivoting fulcrum between said positions, and said at least one sensor for sensing position of the balustrade is beside the pivoting fulcrum of the balustrade.

In a preferred embodiment, the sensor head of the sensor for sensing position of the balustrade is horizontally movable relative to the sensor body. Horizontal movement facilitates forming the individual components and the overall structure low. Horizontal movement is particularly simple to enable owing to the utilization of a cam member and at least sensor as defined. Preferably, the balustrade is arranged to move the sensor head horizontally when pivoted.

In a preferred embodiment, the sensor head of the sensor for sensing position of the balustrade is arranged to be compressed by the one or more protrusions when the balustrade is pivoted such that the sensor head is at a point of a protrusion, and said compression is arranged to be relieved when the sensor head is at a point of a depression.

In a preferred embodiment, said at least one sensor of the sensing arrangement for sensing position of the movable balustrade comprises two of said sensors adjacent to the cam member. Then, preferably said cam member comprises two of said depressions. One of the depressions is then at the point of one of the sensors when the balustrade is in said substantially upright position and another one of the depressions is at the point of another one of the sensors when the balustrade is in said substantially horizontal position. Hereby, it can be reliably sensed whether the balustrade is positioned in one of these two relevant positions. It is preferable, however not necessary, that each of said two of said sensors is beside the cam member on a lateral side thereof, such as on opposite lateral sides. This is advantageous, as it facilitates maintaining the structure low. Said depressions can be at 90 degrees from each other, for instance.

In a preferred embodiment, the sensing arrangement for sensing load of the working platform further comprises a limit stopper for delimiting downwards directed movement of the working platform. The range of downwards directed movement of the working platform 3 is preferably delimited by the limit stopper to be 1.5 cm or less, more preferably 1.0 cm or less.

In a preferred embodiment, the balustrade is a planar structure, such as a plate or a structure comprising plurality of members, such as beams, placed on the same plane.

In a preferred embodiment, the sensing arrangement for sensing load of the working platform is adjusted such that a weight of 10 kg or more can move the working platform downwards such that increase of load of the working platform is sensed. Preferably, weight less than 10 kg cannot move the working platform downwards in this way.

In general, the sensing arrangement for sensing load of the working platform is preferably connected electrically to the elevator control system. The elevator control system can be adapted to perform one or more predefined actions when one or more criteria are met, said criteria including sensing an increase of load of the working platform. Said predefined actions may include one or more of the following: elevator operation mode change from normal operation mode to service operation mode, stop of movement of the elevator car, prevention of further starts of the elevator car in response to signals from passengers.

In general, the sensing arrangement for sensing position of the movable balustrade is preferably connected electrically to the elevator control system. The elevator control system can be adapted to perform one or more predefined actions when one or more criteria are met, said criteria including sensing the balustrade is away from its substantially horizontal position. Said predefined actions may include one or more of the following: elevator operation mode change from normal operation mode to service operation mode, stop of movement of the elevator car, prevention of further starts of the elevator car in response to signals from passengers.

It is also brought forward a second new elevator safety arrangement comprising a hoistway; an elevator car mounted in the hoistway; a working platform mounted on top of roof the elevator car; at least one sensing arrangement for sensing load of the working platform. Said sensing arrangement comprises a sensor for sensing position of the working platform, and in that the working platform comprises a planar upper tread surface for a person to stand on, and a detent member above the level of said planar upper tread surface of the working platform, and the sensor for sensing position of the working platform is in vertical direction between the car roof and the detent member. With this solution, a load placed on the working platform, were it a person or his belonging, will be detectable by the sensing arrangement. Thus, safety of the elevator can be facilitated. Owing to the positioning of the components relative to each other, overall structure of the safety equipment, including the working platform and the sensing arrangement for sensing load of the working platform, can be maintained low. Preferable further details are introduced in the following, earlier above and in the claims of the application, which further details can be combined with the second elevator safety arrangement individually or in any combination.

In a preferred embodiment, the sensor of the sensing arrangement for sensing load of the working platform is beside the planar upper tread surface of the working platform.

In a preferred embodiment, the sensor of the sensing arrangement for sensing load of the working platform comprises a sensor body and a sensor head, and vertical movement of the working platform is arranged to bring the detent member towards the car roof such that it compresses the sensor head.

In a preferred embodiment, the hoistway is at least 10 meters high. The hoistway of course can alternatively be lower than this.

In a preferred embodiment, when the elevator car is at the uppermost landing, in particular such that the sill thereof is level with the sill of the landing, the working platform, in particular the planar upper tread surface thereof, is less than 1.8 meters from the ceiling of the hoistway, in particular from the downwards facing surface of the ceiling of the hoistway.

It is also brought forward a new elevator comprising an elevator safety arrangement as defined anywhere above or elsewhere in the application such as in any of the claims. Preferably, the elevator car is vertically movable in the hoistway. The elevator preferably comprises a hoisting device for this purpose, and a control system for automatically controlling the hoisting device. The elevator is preferably, although not necessarily, a drive sheave elevator, in which case the hoisting device preferably comprises an electric motor for rotating a drive sheave around which a roping connected with the elevator car passes.

In general, the elevator is preferably such that the car thereof is configured to serve two or more vertically displaced landings. The elevator control is preferably configured, when in normal operating mode, to control movement of the car in response to signals from user interfaces located at landing(s) and/or inside the car so as to serve persons on the landing(s) and/or inside the elevator car. Preferably, the car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
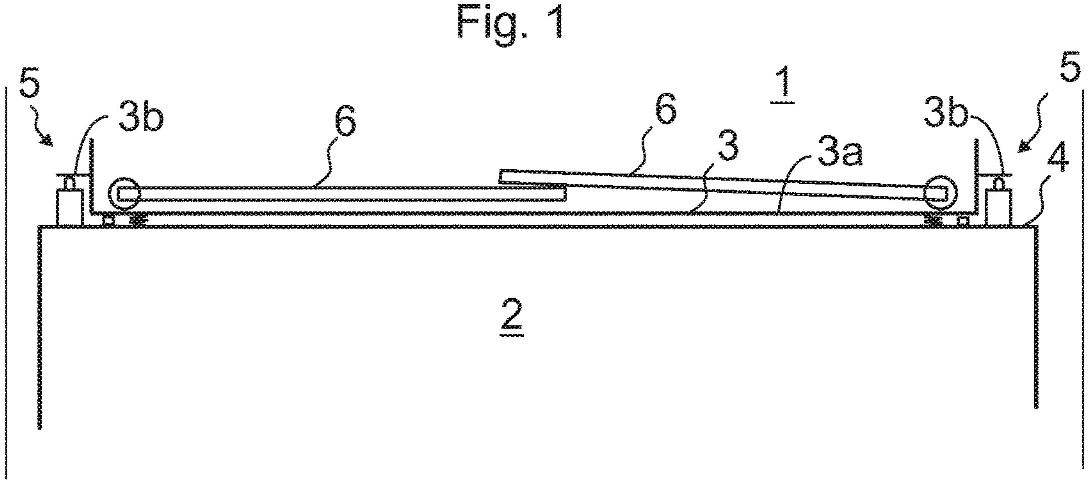
FIG. 1 illustrates a preferred embodiment of an elevator safety arrangement.
Figure 2:
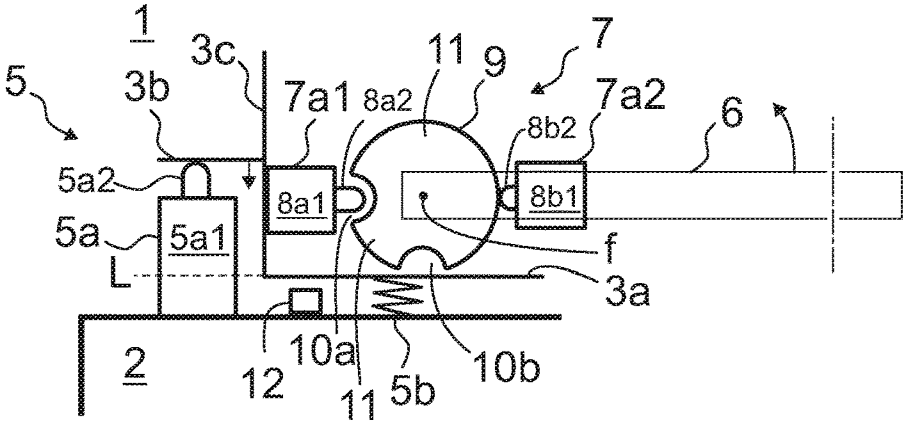
FIG. 2 illustrates preferred details of the elevator safety arrangement, when the working platform and the balustrade of the elevator safety arrangement are in a first state.
Figure 3:
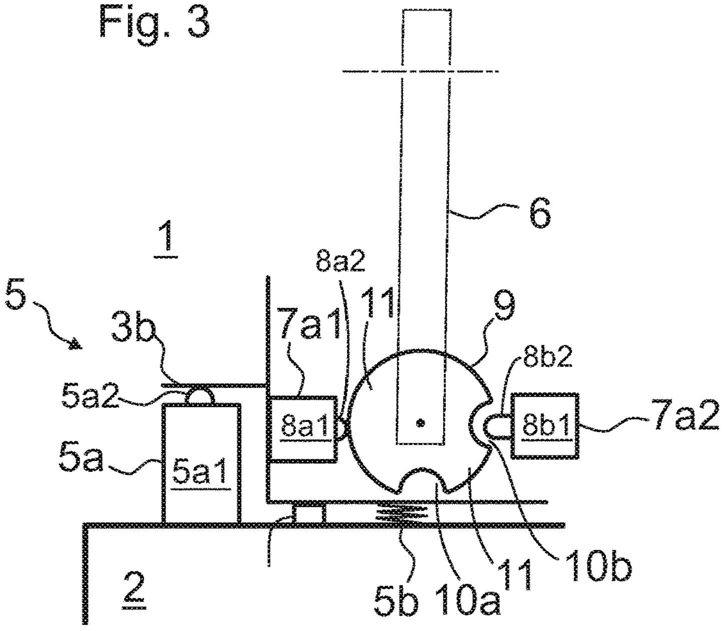
FIG. 3 illustrates preferred details of the elevator safety arrangement, when the working platform and the balustrade of the elevator safety arrangement are in a second state.

FIGS. 1-3 illustrate an embodiment of an elevator safety arrangement comprising a hoistway 1, an elevator car 2 mounted in the hoistway 1, a working platform 3 mounted on top of roof 4 the elevator car 2, at least one sensing arrangement 5 for sensing load of the working platform 3. The working platform 3 comprises a planar upper tread surface 3*a* for a person to stand on. The elevator safety arrangement further comprises at least one balustrade 6 mounted on the working platform 3 such that its weight is carried by the working platform 3, and it is movable between a substantially upright position and a substantially horizontal position. By said sensing arrangement 5 a load placed on the working platform, were it a person or his belongings, will be detectable. The load will be detectable when it is placed to be supported by the planar upper tread surface 3*a* of the working platform 3 but also when the load is placed to be supported by the balustrade because the balustrade is carried by the working platform 3. This is particularly advantageous because should the service person forget his belongings, such as his tool box, on the horizontally tilted balustrade upon leaving the hoistway, this will also be detectable, and thereby actions for avoiding crushing of the toolbox between the car and the hoistway ceiling can be taken.

In the preferred embodiment, the balustrade 6 is a planar structure, such as a plate or a structure comprising plurality of members, such as beams, placed on the same plane. Thus, it can be simply arranged in said substantially horizontal position where it requires only little space in vertical direction. As showed in FIG. 1, the elevator can comprise more than one of said balustrades 6. If these are to be folded partially over each other, as it is the case in the presented embodiment, it may be needed that one of the balustrades 6 is not perfectly horizontal in said substantially horizontal position.

So as to enable reacting to sensing of an increase of load of the working platform 3, the sensing arrangement 5 is preferably connected electrically to the elevator control system. The elevator control system can be adapted to perform one or more predefined actions when one or more criteria are met, said criteria including sensing of an increase of load of the working platform 3. The elevator control system can in this context be understood broadly to include the normal elevator control unit but also the safety circuit of the elevator. Said predefined actions may include one or more of the following: elevator mode change from normal operation mode to service operation mode, stop of movement of the elevator car, prevention of further starts of the elevator car in response to signals from passengers.

As disclosed in FIGS. 1-3, the elevator safety arrangement is further such that in said substantially horizontal position, said balustrade 6 lies over the planar upper tread surface 3*a* of the working platform 3 covering it at least partially. Thereby it blocks direct stepping on the planar upper tread surface 3*a* covered by it. The balustrade 6 extends in said substantially horizontal position along the planar upper tread surface 3*a*, preferably parallelly therewith, but if a slight angle between the balustrade 6 and the planar upper tread surface 3*a* is needed for some reason, then it is preferably less than 10 degrees, more preferably less than 5 degrees. The configuration being parallel, as far as possible, ensures low overall structure for the equipment placed on top of the elevator car 2. Correspondingly, the balustrade 6 extends in said substantially upright position straight upwards, but if a slight angle between the balustrade 6 and vertical plane is needed for some reason then it is preferably less than 10 degrees, more preferably less than 5 degrees.

As disclosed in FIGS. 1-3, the elevator safety arrangement is further such that said balustrade 6 is mounted on the working platform 3 pivotally, preferably via one or more hinges, between said substantially upright position and said substantially horizontal position. When the car 2 is in normal operation mode, the balustrade 6 is to be in said substantially horizontal position. Upon entering the hoistway, by stepping on top of the car roof 4, the service person can manually pivot the balustrade 6 up to said substantially upright position, wherein it serves as a safety blockage against falling from the car roof 4.

In the following preferred details of the sensing arrangement 5 for sensing load of the working platform 3 are discussed. Said sensing arrangement 5 for sensing load of the working platform 3 comprises a sensor 5*a* for sensing position of the working platform 3, as illustrated in Figures. Said sensor 5*a* is also referred to as a position sensor. The sensing arrangement 5 is arranged to sense the load based on position of the of the working platform 3. The working platform 3 comprises a planar upper tread surface 3*a* for a person to stand on, and a detent member 3*b* above the level L of said planar upper tread surface 3*a* of the working platform 3, and the position sensor 5*a* is in vertical direction between the car roof 4 and the detent member 3*b*. This structure provides that the position sensor 5*a* does not decrease the height of the safety space, i.e. the distance between the planar upper tread surface 3*a* of the working platform 3 and the ceiling of the hoistway 1 can be maximized. Structure of the working platform 3 can thus also generally be maintained low. In the preferred embodiment illustrated, the position sensor 5*a* is beside the planar upper tread surface 3*a* of the working platform 3. No planar upper tread surface 3*a* of the working platform 3 needs to be located on top of the position sensor 5*a*. Thereby their structures do not pile up vertically and the overall structure can be made low.

The above mentioned aspects are implemented in the preferred embodiment more specifically such that the working platform 3 comprises a lateral border structure 3*c* extending upwards above the level of the planar upper tread surface 3*a*, and the detent member 3*b* is fixedly connected with the lateral border 3*c*. Said lateral border structure 3*c* is preferably an upright plate section, a so called kick plate section. Said upright plate section and said planar upper tread surface 3*a* are preferably integral parts of a bent metal plate. Thus, the structure is simple to form by bending. Alternatively, said lateral border structure 3*c* can be an upright plate section in the form of a separate edge profile part, preferably made of metal, such as of aluminum for instance.

The sensor head 5*a*2 is preferably vertically movable relative to the body 5*a*1. The aforementioned position sensor 5*a* preferably comprises a sensor body 5*a*1 and a sensor head 5*a*2, and vertical movement of the working platform 3 is arranged to bring the detent member 3*b* downwards and towards the car roof 4, i.e. downwards, such that it compresses the sensor head 5*a*2. The resulting position is disclosed in FIG. 2.

For holding the working platform from moving freely, said sensing arrangement 5 preferably comprises a restriction means therefor. In the preferred implementation of the holding means illustrated in FIGS. 1-3 comprise at least one spring 5*b* arranged to resist downwardly directed movement of the working platform 3. The holding means, i.e. the spring in this case, holds the working platform 3 in an upper position, and resists movement thereof downwards to its lower position. By dimensioning of the spring 5*b*, sensitivity of the sensing arrangement 5 can be adjusted. The sensing arrangement 5 is preferably adjusted such that a weight of 10 kg or more can move the working platform 3 downwards such that the sensor head 5*a*2 is compressed. The sensing arrangement 5 preferably further comprises a limit stopper 12 for delimiting downwards directed movement of the working platform 3. The range of downwards directed movement of the working platform 3 is preferably delimited by the limit stopper 12 to be 1 cm or less. Owing to the limit stopper 12, the moving range of the sensor head 5*a*2 will not be exceeded and overload and breaking thereof is avoided.

The arrangement comprises a sensing arrangement 7 for sensing position of the movable balustrade 6. A preferred implementation of the sensing arrangement 7 is illustrated in FIGS. 1-3. In the presented embodiment, said sensing arrangement 7 for sensing position of the movable balustrade 6 comprises at least one sensor 7*a*1,7*a*2 for sensing position of the balustrade 6. Said sensor 7*a*1,7*a*2 is also elsewhere referred to as a position sensor.

Said balustrade 6 is mounted on the working platform 3 pivotally between said substantially upright position and said substantially horizontal position, in particular around a fulcrum f, and said at least one sensor 7*a*1,7*a*2 is beside the pivoting fulcrum f of the balustrade 6. Thereby, when the balustrade is in its horizontal position as illustrated in FIGS. 1 and 2, the at least one sensor 7*a*1,7*a*2 does not increase the height of the overall structure at all, or at least not significantly.

As for the preferred structure of said at least one sensor 7*a*1,7*a*2, it preferably comprises a sensor body 8*a*1,8*b*1 and a sensor head 8*a*2,8*b*2, as illustrated. Preferably, the sensor head 8*a*2,8*b*2 is horizontally movable relative to the sensor body 8*a*1,8*b*1 as then the sensor is simple to make to have a low structure. The balustrade 6 on the other hand, is preferably arranged to move the sensor head 8*a*2,8*b*2 horizontally when pivoted.

FIG. 2 illustrates the balustrade 6 being in said substantially horizontal position. When the balustrade 6 is pivoted, it ends up in position as disclosed in FIG. 3. The balustrade 6 is preferably arranged to move, and thereby actuate, the sensor head 8*a*2,8*b*2 with a cam member 9. The balustrade 6 then preferably comprises a cam member, such as a cam disc 9 having a non-circular rim, and pivotal together with the balustrade 6 and comprising one or more protrusions 11 and depressions 10*a*, 10*b*. The sensor head 8*a*2,8*b*2 is placed against the cam member for being actuated by aid of at least a protrusion and at least a depression of the cam member 9, in the presented case particularly against the non-circular rim thereof. The sensor head 8*a*2,8*b*2 is arranged to be compressed by the protrusions 11 when the balustrade is pivoted such that the sensor head 8*a*2,8*b*2 is at a point of a protrusion 11, said compression being relieved when the sensor head 8*a*2,8*b*2 is at a point of a depression 10*a*, 10*b*. The sensor itself can contain a returning spring whereby when the sensor head 8*a*2,8*b*2 comes to be at a point of a depression 10*a*, 10*b*, the sensor head 8*a*2,8*b*2 is freed to move into it.

In the presented embodiment, said at least one sensor **7*a*1,7*a*2 comprises two of said sensors 7*a*1,7*a*2 adjacent to the cam member 9, and said cam member 9 comprises two of said depressions 10*a*, 10*b*. One 10*b* of the depressions 10*a*, 10*b* is at the point of one 7*a*2 of the sensors 7*a*1,7*a*2 when the balustrade 6 is in said substantially upright position and another one 10*a* of the depressions 10*a*, 10*b* being at the point of another one 7*a*1 of the sensors 7*a*1,7*a*2 when the balustrade 6 is in said substantially horizontal position. In the presented embodiment, said two of said sensors 7*a*1,7*a*2 are on opposite lateral sides beside the cam member 9, in order to maintain the structure low. In the presented embodiment, said two depressions 10*a*, 10*b*** are at 90 degrees from each other.

So as to enable reacting to sensing of pivoting of the balustrade 6 to its substantially upright position, the sensing arrangement 7 is preferably connected electrically to the elevator control system. The elevator control system can be adapted to perform one or more predefined actions when one or more criteria are met, said criteria including sensing the balustrade 6 is away from its substantially horizontal position. The elevator control system can in this context be understood broadly to include the normal elevator control unit but also the safety circuit of the elevator. Said predefined actions may include one or more of the following: elevator operation mode change from normal operation mode to service operation mode, stop of movement of the elevator car, prevention of further starts of the elevator car in response to signals from passengers. These criteria, particularly for allowance of service operation mode, preferably further include sensing that the balustrade 6 is in said substantially upright position. This will ensure that the balustrade 6 is not only tilted up but tilted up to its correct position.

Figure 4A:
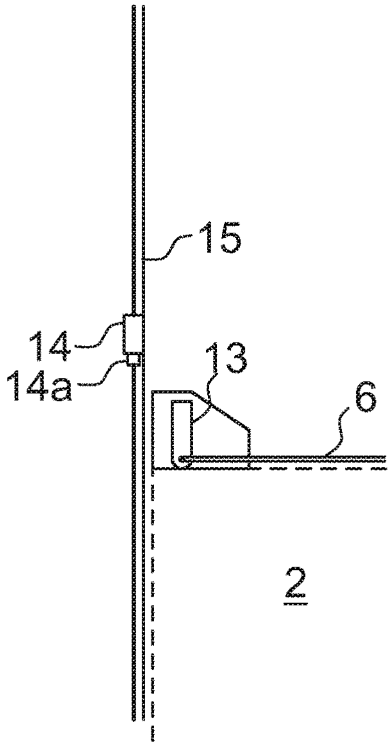
FIGS. 4*a*-4*d* illustrate preferred details of optional further features of the safety arrangement.
Figure 4B:
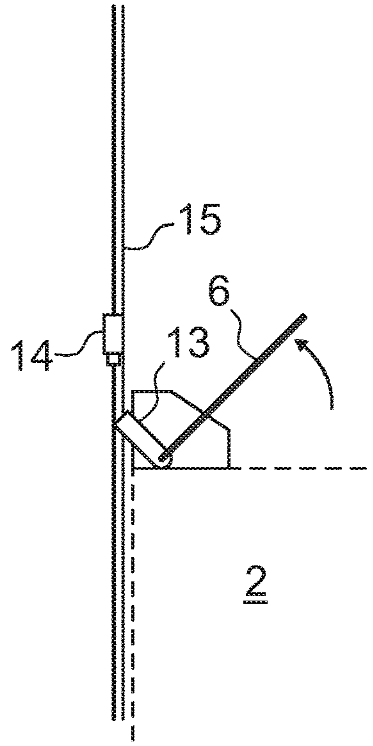
Figure 4C:
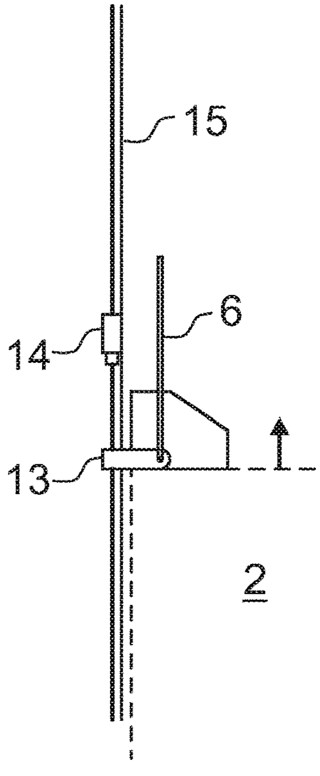
Figure 4D:
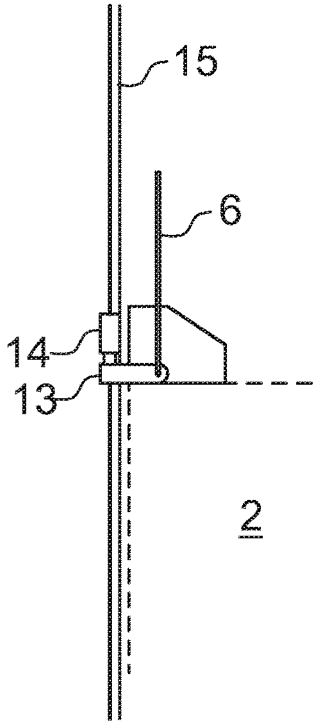

FIGS. **4*a*-4*d* illustrate details of optional further features of the safety arrangement. The arrangement presented in FIGS. 1-3 comprises further a first stopper member 13 fixed on the balustrade 6. The first stopper member 13 is thereby pivotal around the pivoting fulcrum f of the balustrade 6 together with the balustrade 6. The first stopper member 13 is arranged to pivot, when the balustrade 6 is pivoted from said substantially horizontal position to said substantially upright position, together with the balustrade 6 to be aligned with a second stopper member 14 mounted in the hoistway structures, in particular on a guide rail 15 for guiding the elevator car 2 (or alternatively a guide rail for guiding the counterweight) such that the second stopper member 14 is in the path of the first stopper member 13. Thus, should the car 2 be moved, the first and second stopper member 13,14 will eventually collide as illustrated in FIG. 4*d*, and further movement of the car 2 will be blocked. The second stopper member 14 preferably includes a buffer element 14*a* for softening the collision between the stopper member 13 and 14**, for example polyurethane buffer, gas spring or similar.

When the car 2 is in normal operation mode, the balustrade 6 is in said substantially horizontal position, and the first stopper member 13 is not aligned with said second stopper member 14. As illustrated in FIG. **4*b*, upon entering the hoistway 1, by stepping on top of the car roof 4, the service person can manually pivot the balustrade 6 up to said substantially upright position, wherein it serves as a safety blockage against falling from the car roof 4. Simultaneously with pivoting of the balustrade 6, the first stopper member 13 fixed thereon becomes pivoted to be aligned with said second stopper member 14 in accordance with FIG. 4*c* and as described above. Subsequent movement of the car 2 upwards will cause the first and second stopper member 13,14 to collide, which will block further movement of the car 2**.

In general, it is preferred that in the service operation mode, the elevator does not serve passengers automatically. Particularly, the elevator car is not movable automatically in response to passenger signals received from user interfaces for passengers, such as ones located at landings and/or inside the elevator car. However, preferably the elevator car 2 is movable by aid of manually operable service drive equipment, such as a user interface for a service person, which user interface is preferably located on top of the elevator car 2.

In general, each said sensor **5*a*,7*a*1,7*a*2** can be any kind of a sensor suitable for sensing position. It can be in the form of a switch, such as an NC- or NO-switch, for instance. This type of sensors have the advantage that they are reliable and simply usable for safety related limit monitoring. They are simply connectable with a safety circuit of the elevator, for instance. Also other kind of sensors suitable for this function are commercially available and usable instead of a switch type position sensor described.

In the embodiments showed in Figures and described above, the elevator safety arrangement is disclosed to comprise a sensing arrangement 5 for sensing load of the working platform 3. The sensing arrangement 7 for sensing position of the movable balustrade 6 is advantageous in the context disclosed. However, at least part of the advantages of the safety arrangement can be obtained even if the features of the disclosed context are not present, such as without a sensing arrangement 5 for sensing load of the working platform 3 and its related features.

In the embodiments showed in the Figures and described above, a preferred number and shape of protrusions and depressions has been disclosed. However, the number and/or shape of the protrusions and depressions could be also different than what is disclosed. Generally, a suitable number and shape of the protrusions and depressions can be chosen depending of the desired position of the sensor(s). The suitable number and shape of the protrusions and depressions may also be dependent on the position information desired to be obtained, such as accuracy thereof, and which position(s) of the balustrade are regarded meaningful. For instance, a depression could cover a smaller or wider angle of the circumference of the cam member than what is shown in the Figures. A depression could even cover an angle of the circumference of the cam member as wide as 180 degrees or more, for instance.

It is to be understood that the above description and the accompanying figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. An elevator safety arrangement comprising a hoistway;

an elevator car mounted in the hoistway;

a working platform;

at least one movable balustrade, movable between a substantially upright position and a substantially horizontal position;

a sensing arrangement configured to sense a position of the at least one movable balustrade, said sensing arrangement for sensing position of the at least one movable balustrade comprising at least two sensors for sensing position of the at least one movable balustrade, wherein said at least two sensors configured to sense the position of the at least one movable balustrade comprise a sensor body and a sensor head, and the sensor head is movable relative to the sensor body, and the at least one movable balustrade is configured to move the sensor head when pivoted, the at least one movable balustrade comprising a cam member pivotal together with the at least one movable balustrade, the cam member comprising one or more protrusions and depressions, the sensor head is placeable against the cam member for being actuated by aid of at least one protrusion and at least one depression of the cam member where at least one protrusion or depression is configured to actuate a first sensor of said at least two sensors to indicate the upright position of the at least one movable balustrade, and at least one protrusion or depression is configured to actuate a second sensor of said at least two sensors to indicate the horizontal position of the at least one movable balustrade.

2. An elevator safety arrangement according to claim 1, wherein the sensor head is horizontally movable relative to the sensor body, and the at least one movable balustrade is configured to move the sensor head horizontally when pivoted.

3. An elevator safety arrangement according to claim 1, wherein the at least one movable balustrade is mounted on the working platform pivotally between said substantially upright position and said substantially horizontal position.

4. An elevator safety arrangement according to claim 1, wherein the at least one movable balustrade is mounted on the working platform pivotally around a pivoting fulcrum between said positions, and said at least one sensor configured to sense the position of the at least one movable balustrade is beside the pivoting fulcrum of the at least one movable balustrade.

5. An elevator safety arrangement according to claim 1, wherein in said substantially horizontal position the at least one movable balustrade lies over the planar upper tread surface of the working platform covering the working platform at least partially.

6. An elevator safety arrangement according to claim 1, wherein the sensor head is configured to be compressed by the one or more protrusions when the at least one movable balustrade is pivoted such that the sensor head is at a point of a protrusion, and said compression is configured to be relieved when the sensor head is at a point of a depression.

7. An elevator safety arrangement according to claim 1, wherein said at least one sensor comprises two of said sensors adjacent to the cam member.

8. An elevator safety arrangement according to claim 7, wherein one of the depressions is at the point of one of the sensors when the at least one movable balustrade is in said substantially upright position and another one of the depressions is at the point of another one of the sensors when the at least one movable balustrade is in said substantially horizontal position.

9. An elevator safety arrangement according to claim 7, wherein each of said two of said sensors is beside the cam member on a lateral side thereof.

10. An elevator safety arrangement according to claim 1, wherein said cam member comprises two of said depressions.

11. An elevator safety arrangement according to claim 1, wherein the at least one movable balustrade is mounted on the working platform such that its weight is carried by the working platform.

12. An elevator comprising an elevator safety arrangement as defined in claim 1.

* * * * *